United States Patent [19]

Tsuboi et al.

[11] 4,296,541
[45] Oct. 27, 1981

[54] TOOL STORAGE MAGAZINE FOR A MACHINE TOOL

[75] Inventors: Akira Tsuboi; Shiro Kato, both of Kariya, Japan

[73] Assignee: Toyoda Koki Kabushiki Kaisha, Kariya, Japan

[21] Appl. No.: 100,722

[22] Filed: Dec. 6, 1979

[30] Foreign Application Priority Data

Jan. 13, 1979 [JP] Japan .................................. 54-3320

[51] Int. Cl.³ .......................................... B23Q 3/157
[52] U.S. Cl. ...................... 29/568; 408/35; 414/776
[58] Field of Search .......................... 29/568; 408/35; 414/776, 779

[56] References Cited

U.S. PATENT DOCUMENTS

| | | | |
|---|---|---|---|
| 3,760,491 | 9/1973 | Zankl et al. | 29/568 |
| 3,886,652 | 6/1975 | Roubloff et al. | 29/568 |
| 4,164,809 | 8/1979 | Tsuboi | 29/568 |
| 4,182,021 | 1/1980 | Kato | 29/568 |

FOREIGN PATENT DOCUMENTS 2152119 10/1971 Fed. Rep. of Germany ........ 29/568
52-13185 2/1977 Japan ................................. 29/568

*Primary Examiner*—William R. Briggs
*Attorney, Agent, or Firm*—Oblon, Fisher, Spivak, McClelland & Maier

[57] ABSTRACT

A tool storage magazine of the type wherein a circulatable endless chain pivotably carries a plurality of tool storage sockets is provided with a cradle member adapted to carry thereon any of the tool sockets indexed to an exchange position and a mechanism for pivoting the cradle member between horizontal and vertical positions. The magazine is further provided with a locking mechanism which prevents a holding plunger of any tool socket indexed to the exchange position from being disengaged from a tool received in the tool socket until the cradle member is pivoted to the vicinity of the vertical position so that the dropping of a tool from an associated tool socket is reliably prevented during pivotal movement of the cradle member.

5 Claims, 5 Drawing Figures

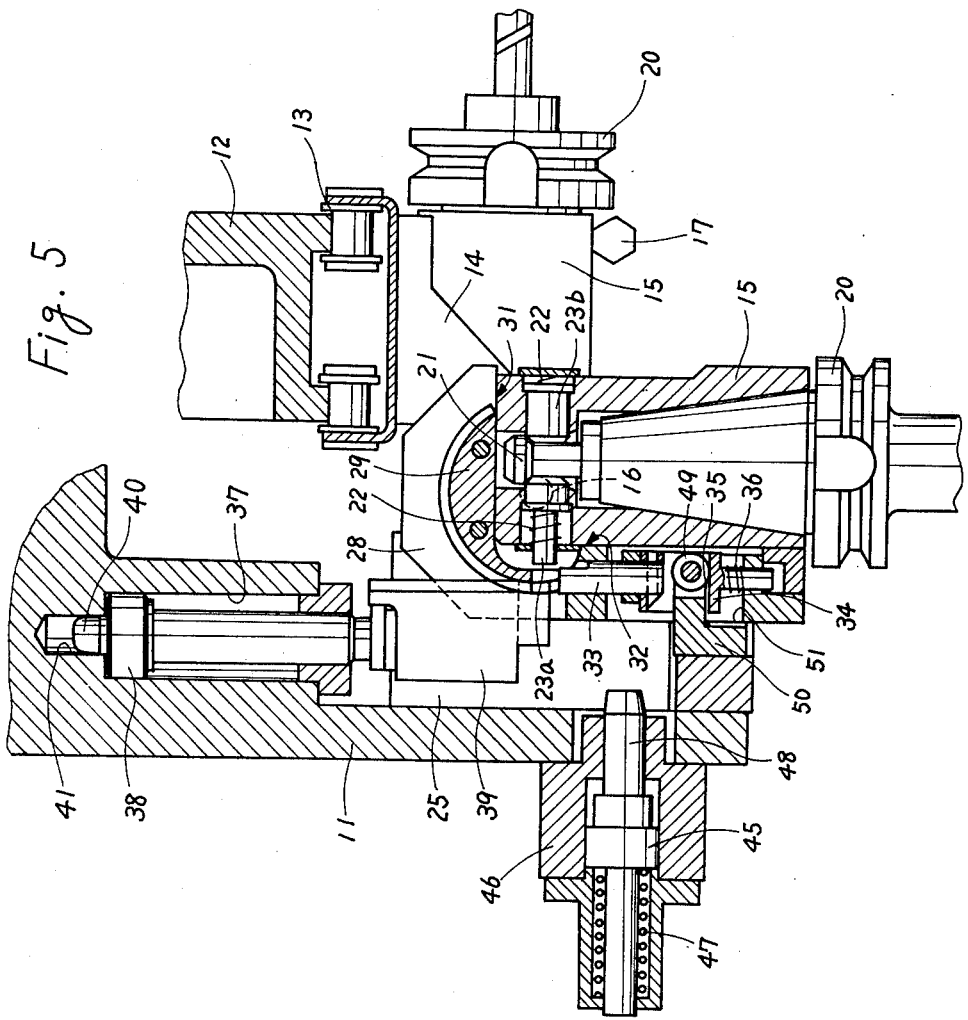

TOOL STORAGE MAGAZINE FOR A MACHINE TOOL

BACKGROUND OF THE INVENTION

1. Field of the Invention

The present invention relates in general to a tool storage magazine for use in a machine tool with a tool exchange function and more particularly, to a tool magazine of the type wherein a plurality of tool sockets each for storing a cutting tool therein are pivotably carried on an indexable support element such as a rotatable disc, a circulatable endless chain and any other movable element.

2. Description of the Prior Art

Generally, a vertical spindle machine tool with an automatic tool exchange function is provided with a tool storage magazine of the type wherein a plurality of tool sockets are pivotably carried, each for removably storing a tool therein. In the magazine, the tool sockets are usually held horizontally, and an indexing operation is performed to index to an exchange position one of the tool sockets that receives a desired tool therein. The tool socket receiving the desired tool is then pivoted from a horizontal position to a vertical position where it has a parallel relation with the axis of a tool spindle of the machine tool, and a tool exchange operation is subsequently carried out. Accordingly, it is necessary to provide the tool magazine with a device which prevents the dropping of a tool from any tool socket when the same is pivoted at the exchange position.

SUMMARY OF THE INVENTION

It is therefore a primary object of the present invention to provide an improved tool storage magazine capable of preventing the displacement of a tool from any tool socket when the same is pivoted to an exchange position.

Another object of the present invention is to provide an improved tool storage magazine wherein any tool is locked on an associated tool socket during a substantial part of the pivotal movement of the tool socket in an exchange position, but is automatically unlocked therefrom at a final part of such pivotal movement.

A further object of the present invention is to provide an improved tool storage magazine of the character set forth above wherein the pivotal movement of any tool socket at an exchange position is utilized to unlock a tool from the tool socket at a final part of such pivotal movement, so that there can be eliminated any actuator which may be otherwise provided for exclusive use in performing such unlocking.

Briefly, the foregoing objects are attained by the present invention through the provision of a tool storage magazine, which comprises a plurality of tool sockets selectively indexable to an exchange position and each pivotable at the exchange position. A holding plunger is slidably received in each of the tool sockets and is urged by a first bias element toward the engagement with a tool, stored in an associated one of the tool sockets, for holding the tool therein. A cradle member, adapted to carry any of the tool sockets indexed to the exchange position, is pivotable about the same axis as the pivotal movement of any of the tool sockets indexed to the exchange position and is pivotally moved by the actuation of a pivot drive mechanism between first and second angular positions.

A locking member is carried on the cradle member and is urged by a second bias element to move onto the sliding path of the holding plunger of any tool socket carried on the cradle member. An unlocking member is further provided which is engaged with the locking member for retracting the same against the second bias element from the sliding path of the holding plunger of the tool socket carried on the cradle member when the same is pivoted by the pivot drive mechanism to the vicinity of the second angular position. Accordingly, the holding plunger of any tool socket carried on the cradle member is continuously locked by the locking member during a substantial part of the pivotal movement of the cradle member which makes it possible to prevent the tool from falling from the tool socket under the action of centrifugal force. Further, the unlocking of the holding plunger from the locking member is carried out by utilizing the pivotal motion of the cradle member, and there can therefore be eliminated any actuator which may otherwise be provided for exclusive use in releasing the holding plunger from the locking by the locking member.

BRIEF DESCRIPTION OF THE DRAWINGS

Various other objects, features and attendant advantages of the present invention will be readily appreciated as the same becomes better understood by reference to the following detailed description of a preferred embodiment when considered in connection with the accompanying drawings, wherein like reference numerals designate same or corresponding parts throughout the several views, and in which:

FIG. 5 is a sectional view of the magazine taken along the same line as FIG. 2, however, illustrating another condition of operation.

DETAILED DESCRIPTION OF A PREFERRED EMBODIMENT

Figure 1:
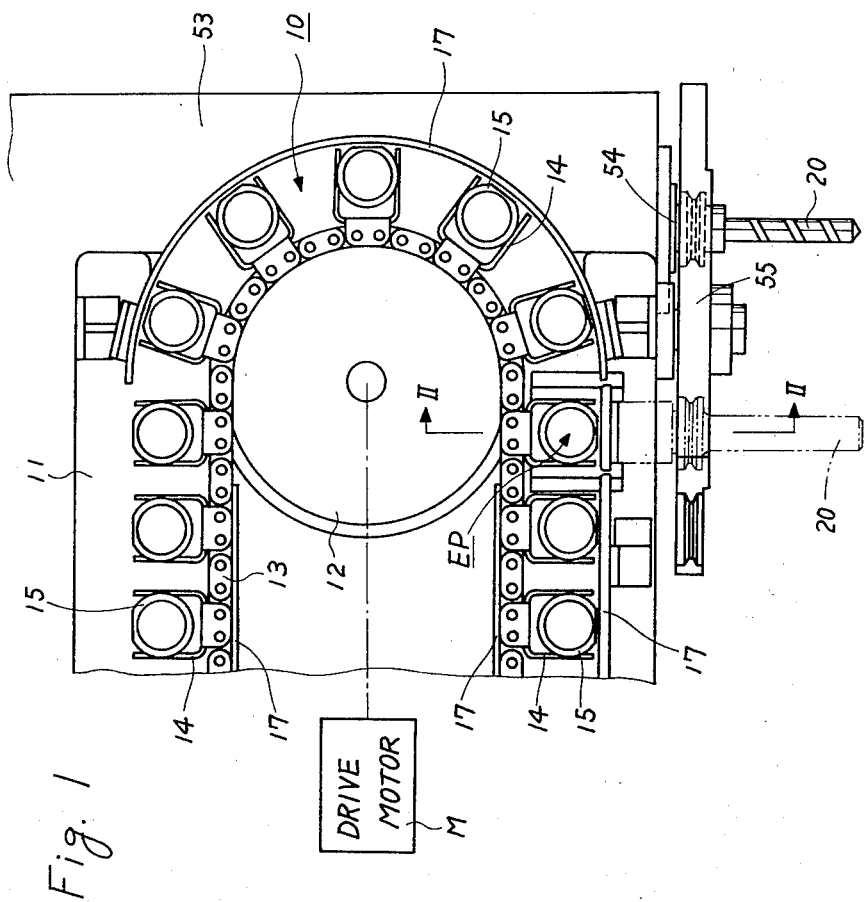
FIG. 1 is a side elevational view of an important portion of a machine tool having a tool storage magazine according to the present invention.

Referring now to the drawings and, more particularly, to FIG. 1 thereof, a vertical spindle machine tool is illustrated having a chain type tool storage magazine 10, which is mounted on a lateral surface of a machine tool column (not shown). The magazine 10 comprises a magazine base 11, on which a drive sprocket 12 drivingly connected to a drive motor M and a following wheel, not shown, are carried for rotation about respective horizontal axes disposed at a predetermined interval. An endless chain 13 is wound around the drive sprocket 12 and the following wheel and is in meshing engagement with the drive sprocket 12. The chain 13 has carried thereon with regular intervals a plurality of U-shape socket supports 14, by each of which a tool socket 15 is pivotably carried through a pair of hinge pins 16, 16 as clearly shown in FIG. 3. The magazine base 11 also mounted thereon a guide track 17, which is extended along the motion locus of the tool sockets 15 for horizontally guiding the tool sockets 15. The guide track 17 is discontinued at an exchange position EP for permitting pivotal movement of any tool socket 15 indexed to the exchange position EP.

Figure 2:
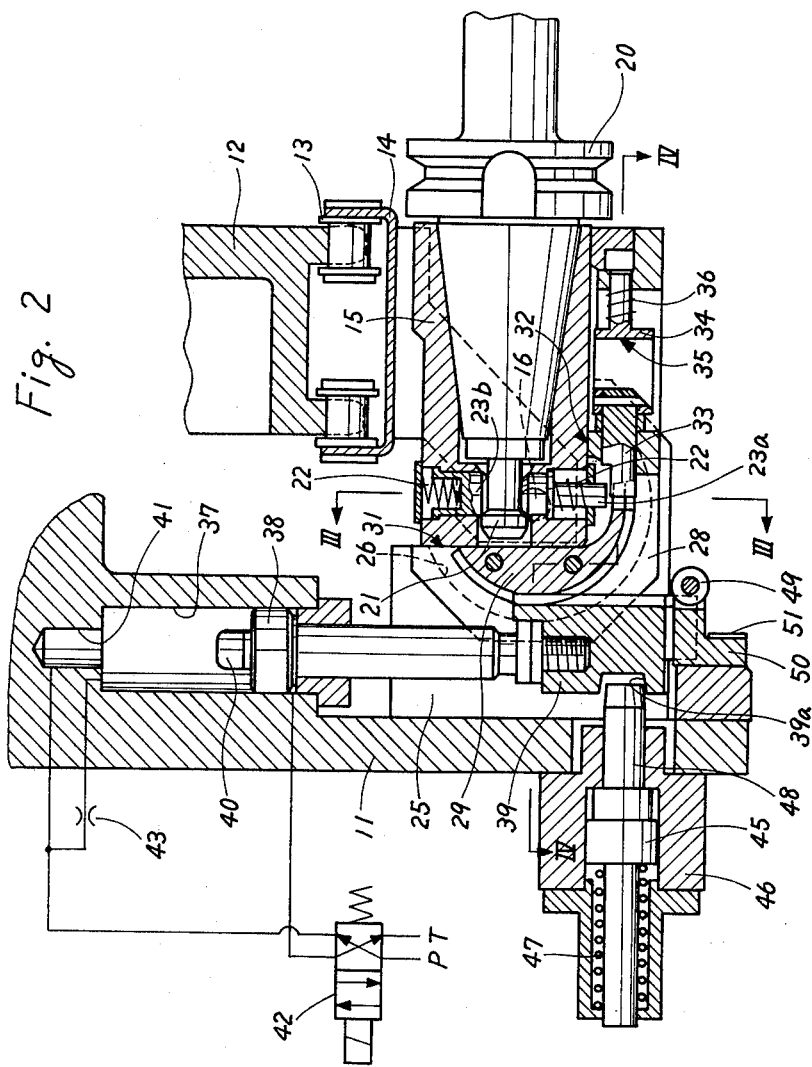
FIG. 2 is a sectional view of the tool storage magazine taken along the line II—II of FIG. 1.

As shown in detail in FIG. 2, a tool 20 is removably inserted into each of the tool sockets 15. A pair of holding plungers 23a, 23b are received in each tool socket 15 for movement in a radial direction thereof and are biased by means of springs 22, 22 for engagement with a pull stud 21 protruding from a rear end of each tool 15. One of the pairs of the holding plungers, for example, 23a is protruded from a lateral flat surface of each tool socket 15. The springs 22, 22 biasing the plungers 23a, 23b have spring forces sufficient to support each tool 20 against its gravity, so that even when each tool socket 15 at the exchange position EP is pivoted to a vertical position, the tool 20 received in the tool socket 15 can be prevented from being disengaged therefrom due to its gravity.

Figure 4:
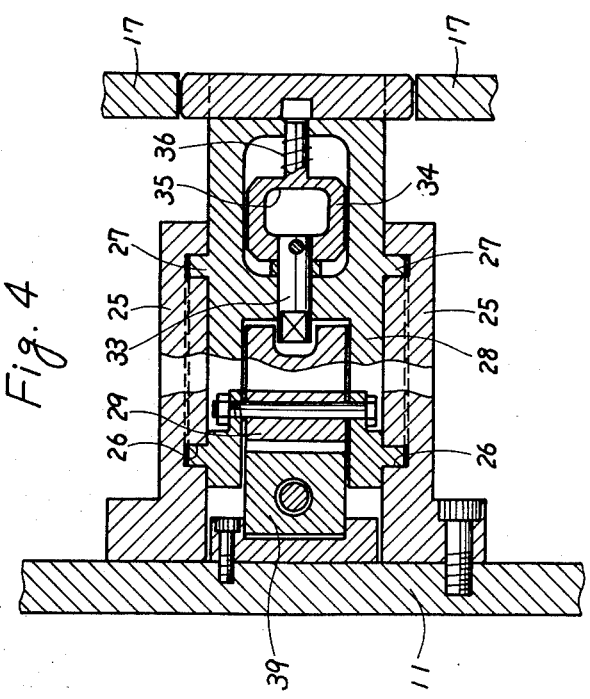
FIG. 4 is a sectional view of the magazine taken along the line IV—IV of FIG. 2.

At the exchange position EP, as best shown in FIG. 4, a pair of support plates 25, 25 are fixed to the magazine base 11 with a predetermined space in the indexing direction of the tool sockets 15. The support plates 25, 25 have respectively formed at their inside surfaces arch grooves 26, 26 which are in concentric relation with the pivot axis (the hinge pins 16, 16) of the tool socket 15 having been indexed to the exchange position EP. A cradle member 28 has a pair of arch rails 27, 27 protruding from opposite lateral surfaces thereof and is pivotably carried between the support plates 25, 25 with the arch rails 27, 27 being slidably fitted respectively in the arch grooves 26 and 26. A crescent pinion 29 is secured to the cradle member 28 in concentric relation with the arch grooves 26, 26. The cradle member 28 takes the form of almost an L-letter and is engageable at two orthogonal abutting surfaces 31, 32 with rear and under surfaces of each tool socket 15 having been indexed to the exchange position EP. Therefore, each tool socket 15 which is released from the guide by the guide track 17 is held horizontally by the cradle member 28 even at the exchange position EP.

A cam member 34 is carried on the cradle member 28 for sliding movement in a direction transverse to the movement of the holding plunger 23a. The cam member 34 is provided at one end thereof with a locking pin 33, which is movable onto the sliding path of the holding plunger 23a for obstructing the antispring retraction of the holding plunger 23a. Cam member 34 is formed with an engaging hole 35, which is engageable with an actuation roll 49, as will be fully described later.

A spring 36 is interposed between the cradle member 28 and the cam member 34 for urging the cam member 34 to move to such a locking position as to present the locking pin 33 onto the sliding path of the holding plunger 23a. The locking pin 33, when so presented, serves to obstruct the retraction of the holding plunger 23a, so that the tool 20 being received in a tool socket 15 at the exchange position EP can be prevented from falling therefrom during the pivotal movement of the cradle member 28.

The magazine base 11 is formed with a socket pivoting cylinder 37, in which a piston 38 is slidably received. A piston rod of the piston 38 has secured to one end thereof a rack member 39 which is in meshing engagement with the pinion 29. The piston 38 protrudes from the other end thereof with a tapered stub rod 40, and a small hole 41 into which the tapered stub rod 40 is fitted when the piston 38 is moved near to its advanced end is opened at an upper end surface of the socket pivoting cylinder 37. The small hole 41 and the lower chamber of the cylinder 37 are in fluid communication with a pressurized fluid supply through a magnetic changeover valve 42, and the upper chamber of the cylinder 37 is in fluid communication with the small hole 41 through a throttle valve 43. Accordingly, when the piston 38 is upwardly advanced to such a position as to enter an outer end of the tapered stud rod 40 into the small hole 41, the volume of fluid that is discharged from the upper chamber via the small hole 41 is gradually decreased in proportion to the subsequent advance movement of the piston 38, and this results in gradually decelerating the advance speed of the piston 38 to that controlled by the throttle valve 43.

Mounted on a back surface of a magazine base 11 is a positioning cylinder 46, in which a piston 45 is contained for sliding movement in a direction perpendicular to the movement of the rack member 39. The piston 45 has protruded from its one end of a rod 48, an outer end of which is engageable with a notch 39a formed on the rack member 39. A spring 47 is provided in a left chamber of the cylinder 46 for urging the piston 45 toward an advanced end to thereby bring the rod 48 into engagement with the notch 39a. Accordingly, when the rod 48 is engaged with the notch 39a, the upward advance movement of the rack member 39 is obstructed so that the cradle member 28 can be prevented from being pivoted due to the gravity of the tool socket 15 and the tool 20 which have been indexed to the exchange position EP. On the other hand, when the rod 48 is retracted against the force of the spring 47 to thereby be disengaged from the notch 39a, pivotal movement of the cradle member 28 becomes possible.

Figure 3:
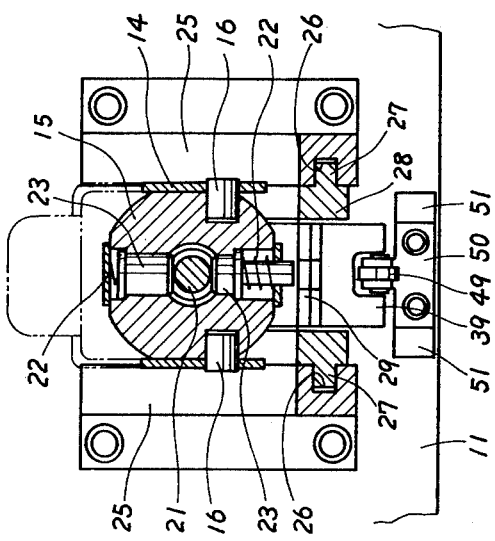
FIG. 3 is a sectional view of the magazine taken along the line III—III of FIG. 2.

As clearly shown in FIGS. 2 and 3, on the magazine base 11 and in a position so as to be in an abuttable relation with the cradle member 28 is fixedly mounted a support base 50, which rotatably carries the above-noted actuation roll 49 engageable with the engaging hole 35 of the cam member 34. The actuation roll 49 serves to engage the engaging hole 35 in the event that the cradle member 28 is pivotally advanced toward its advanced end as shown in FIG. 5 and to retract the cam member 34 against the force of the spring 36 until the cradle member 28 thereafter reaches the pivotal advanced end. The support block 50 is formed with abutting surfaces 51, 51 which act to stop the pivotal movement of the cradle member 28 upon abutting engagement therewith.

Referring now back to FIG. 1, there is illustrated a machine tool spindle head 53, which is carried on a front portion of the above-noted machine tool column (not shown) for vertical sliding movement. A tool spindle 54, carried in the spindle head 53, is rotatable about a vertical axis and is arranged to removably receive a tool 20 at the lowermost end thereof. In order to perform a tool exchange between the tool spindle 54 and each tool socket 15 held vertically at the exchange station EP, an exchange arm 55, which is reversibly rotatable about and slidable along a vertical axis, is carried by an arm support mounted on the machine tool column.

The operation of the apparatus as constructed above will now be described. While a machining operation is performed with a tool 20 received in the tool spindle 54, the drive sprocket 12 is rotated by the drive motor M to circulate the chain 13, and thus, the tool sockets 15 each receiving a tool 20 are selectively and successively loaded onto the cradle member 28 held horizontally at the exchange position EP. The circulation of the chain 13 is discontinued when the tool socket 15 receiving the tool 20 to be next used is loaded onto the cradle member 28 in alignment therewith, and the cradle member 28 and the tool socket 15 loaded thereonto remain as they are until completion of the machining operation.

Upon such completion of the machining operation, the spindle head 53 is elevated on the column (not shown) to a home position in advance of a successive tool exchange operation, and at the same time, the tool socket 15 at the exchange position EP is pivoted in the following manner. First, pressurized fluid is conducted into the right chamber of the positioning cylinder 46 to thereby retract the rod 48 against the force of the spring 47 with the result of disengagement from the notch 39a. Switching of the change-over valve 42 is then effected to conduct pressurized fluid into the lower chamber of the socket pivoting cylinder 37, and the piston 38 is upwardly advanced together with the rack member 39 to thereby bodily pivot the pinion 29 and the cradle member 28 along the arch grooves 26, 26 of the support plate 25, 25 in a clockwise direction as viewed in FIG. 2. Consequently, the tool socket 15 on the cradle member 28 is also pivoted together with the cradle member 28 about hinge pins 16, 16 whereby the position of the tool socket 15 is changed from the horizontal position shown in FIG. 2 to the vertical position shown in FIG. 5.

In the course of the pivotal movement of the cradle member 28, the cam member 34 is engaged at its engaging hole 35 with the actuation roll 49 and is gradually moved by the actuation roll 49 relative to the cradle member 28 against the force of the spring 36 as the cradle member 28 is further pivoted. It is to be noted that although the engagement of the cam member 34 with the actuation roll causes the locking pin 33 to begin to be displaced relative to the holding plunger 23a of the tool socket 15, the abutting relation between the holding plunger 23a and the locking pin 33 is maintained until the cradle member 28 reaches the vicinity of its pivotal advanced end so that the falling of the tool 20 from the tool socket 15 can be reliably prevented. When the cradle member 28 reaches the vicinity of its pivotal advanced end, the tapered stub rod 40 of the piston 38 begins to enter into the small hole 41 of the socket pivoting cylinder 37, and the volume of fluid discharged from the upper chamber of the cylinder 37 is gradually decreased under the action of the throttle valve 43 whereby the sliding speed of the piston 38 and accordingly, the pivotal speed of the cradle member 28, are gradually decelerated. When the cradle member 28 subsequently reaches its pivotal advanced end, the actuation by the actuation roll 49 of the cam member 34 causes the locking pin 33 to move to an unlocked position to thereby permit retraction of the holding plunger 23a and thus, removal of the tool 20 from the pivoted tool socket 15 becomes possible. It is to be realized herein that in this situation, the holding plungers 23a, 23b biased by the springs 22 and 22 still have a holding ability sufficient to prevent the disengagement of the tool 20 from the pivoted tool socket 15. When the 90 degree pivotal movement of the cradle member 28 and the tool socket 15 is completed in this manner, cradle member 28 is brought into abutting engagement with the abutting surfaces 51, 51 of the support block 50.

Upon completion of the return of the spindle head 53 to the elevated home position and pivoting of the cradle member 28 at the exchange position EP, the exchange arm 55 is pivoted through a predetermined angle so as to cause grippers provided on its opposite ends to simultaneously grip the tools 20, 20 being received in the tool spindle 54 and the pivoted tool socket 15. Downward extension movement, 180-degree pivotal movement and upward retraction movement of the exchange arm 55 are subsequently performed in succession, whereby the tool 20 removed from the tool spindle 54 and the tool 20 removed from the pivoted tool socket 15 are inserted, respectively, into the pivoted tool socket 15 and the tool spindle 54. The exchange arm 55 is then pivotally returned to its original or parked position, and one cycle of the tool exchange operation of the exchange arm 55 is thus completed.

Following the returning of the exchange arm 55 to the parked position, the spindle head 53 is downwardly moved for the initiation of a successive machining operation, and the socket pivoting cylinder 37 is reversely operated to thereby pivot the cradle member 28 together with the tool socket 15 from the vertical position to the horizontal position. Pivotal return movement of the cradle member 28 causes disengagement of the cam member 34 from the actuation roll 49, and thus, the cam member 34 is moved by the force of the spring 36 to thereby present the locking pin 33 onto the sliding path of the holding plunger 23a so that the same can be prevented from retraction.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A tool storage magazine for a machine tool comprising:
   a plurality of tool sockets mounted to be selectively indexable to an exchange position and pivotable at said exchange position;
   a holding plunger slidably received in each of said tool sockets and engageable with a tool stored in an associated one of said tool sockets for holding said tool therein;
   first bias means provided in each of said tool sockets for urging said holding plunger toward engagement with said tool stored in an associated one of said tool sockets;
   a cradle member pivotably mounted at said exchange position about the same axis as the pivotable movement of any of said tool sockets indexed to said exchange position and having means to carry any of said tool sockets indexed to said exchange position;
   a pivot drive mechanism connected to said cradle member for pivoting the same between first and second angular positions;
   a locking member carried on said cradle member and movable onto the sliding path of said holding plunger of any of said tool sockets carried in said cradle member for inhibiting disengagement of said holding plunger from said tool stored in any of said tool sockets;
   second bias means provided on said cradle member for urging said locking member onto the sliding path of said holding plunger of any of said tool sockets carried on said cradle member; and
   unlocking means engageable with said locking member for retracting the same against said second bias means from the sliding path of said holding plunger of any tool socket carried on said cradle member when said cradle member is pivoted by said pivot drive mechanism to the vicinity of said second angular position.

2. A tool storage magazine as set forth in claim 1, said unlocking means comprising an engaging member fixedly disposed in position so as to engage with said locking member when said cradle member pivotally reaches the vicinity of said second angular position and to move said locking member against said second bias means as said cradle member is further pivoted from the vicinity of said second angular position to said second angular position.

3. A tool storage magazine as set forth in claim 2, said pivot drive mechanism comprising:
a hydraulic actuator connected to said cradle member for pivoting the same between said first and second angular positions; and
speed control means for controlling said hydraulic actuator to decelerate the pivotal speed of said cradle member when the same reaches the vicinity of said second angular position.

4. A tool storage magazine as set forth in claim 3, said pivot drive mechanism further comprising:
a rack member connected to and reciprocatively moveable by said hydraulic actuator; and
a pinion member integrally pivotable with said cradle member and held in meshing engagement with said rack member.

5. A tool storage magazine as set forth in claim 1 or 2 or 3,
said cradle member having an L-letter form and comprising at least two abutting surfaces for carrying any of said tool sockets indexed to said exchange position from two directions and for permitting passage of any of said tool sockets across said exchange position.

* * * * *